United States Patent [19]

Hayes et al.

[11] Patent Number: 5,892,483
[45] Date of Patent: Apr. 6, 1999

[54] DUAL ANTENNA ARRANGEMENT FOR PORTABLE TRANSCEIVER

[75] Inventors: Gerard James Hayes, Wake Forest; Ross Warren Lampe, Jr., Raleigh, both of N.C.

[73] Assignee: Ericsson Inc., RTP, N.C.

[21] Appl. No.: 616,848

[22] Filed: Mar. 15, 1996

[51] Int. Cl.[6] .............................. H01Q 1/00; H01Q 1/24
[52] U.S. Cl. ............................................. 343/729; 343/702
[58] Field of Search ..................................... 343/702, 725, 343/729, 895, 906, 700 MS, 715, 900

[56] References Cited

U.S. PATENT DOCUMENTS

| | | | |
|---|---|---|---|
| 4,121,218 | 10/1978 | Irwin et al. | 343/702 |
| 4,719,470 | 1/1988 | Munson | 343/700 MS |
| 4,862,182 | 8/1989 | Egashira | 343/702 |
| 4,868,576 | 9/1989 | Johnson, Jr. | 343/702 |
| 4,958,382 | 9/1990 | Imanishi | 455/277 |
| 5,138,329 | 8/1992 | Saarnimo et al. | 343/702 |
| 5,204,687 | 4/1993 | Elliott et al. | 343/702 |
| 5,212,491 | 5/1993 | Chin et al. | 343/745 |
| 5,245,350 | 9/1993 | Sroka | 343/725 |
| 5,317,325 | 5/1994 | Bottomley | 343/702 |
| 5,321,738 | 6/1994 | Ha | 379/61 |
| 5,335,367 | 8/1994 | Adachi et al. | 455/90 |
| 5,353,036 | 10/1994 | Baldry | 343/702 |
| 5,412,393 | 5/1995 | Wiggenhorn | 343/702 |
| 5,446,469 | 8/1995 | Makino | 343/702 |
| 5,463,406 | 10/1995 | Vannatta et al. | 343/702 |
| 5,469,177 | 11/1995 | Rush et al. | 343/895 |
| 5,479,178 | 12/1995 | Ha | 343/702 |
| 5,546,094 | 8/1996 | Egashira | 343/702 |

FOREIGN PATENT DOCUMENTS 317001 12/1989 Japan .

*Primary Examiner*—Donald T. Hajec
*Assistant Examiner*—Tan Ho
*Attorney, Agent, or Firm*—James P. Davidson

[57] ABSTRACT

An antenna arrangement for a portable transceiver is disclosed as including a printed circuit antenna mounted on the transceiver and coupled to be driven by circuitry of the transceiver. An extendable monopole antenna is also mounted on the transceiver and is adapted to be electrically coupled to the printed circuit antenna when in an extended position and to be electrically decoupled from the printed circuit antenna when in a retracted position. A connector is fixedly attached to the printed circuit antenna at a first end and maintains contact with the monopole antenna at a second end as the monopole antenna slides between the extended and retracted positions. The monopole antenna includes a conductive portion which is in contact with the connector in the extended position and a non-conductive portion which is in contact with the connector in the retracted position. A separate circuit may be provided for sensing the position of the monopole antenna, where the circuit permits the transceiver to transmit at full power when the monopole antenna is in the extended position and permits the transceiver to transmit at reduced power when the monopole antenna is in the retracted position.

25 Claims, 3 Drawing Sheets

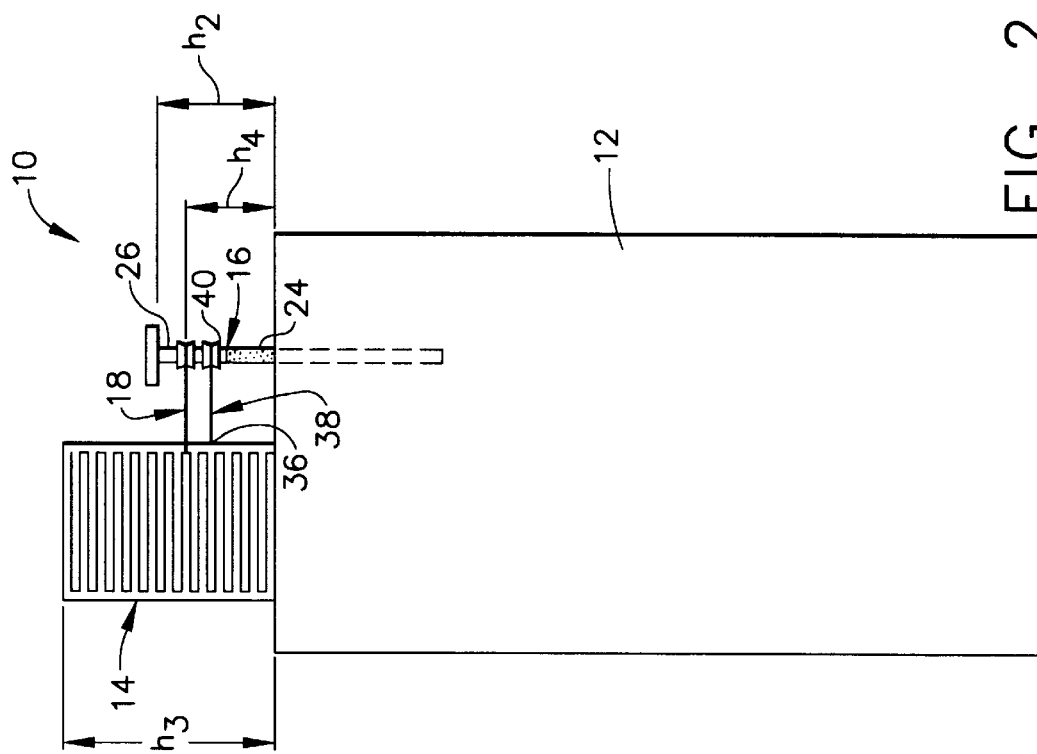
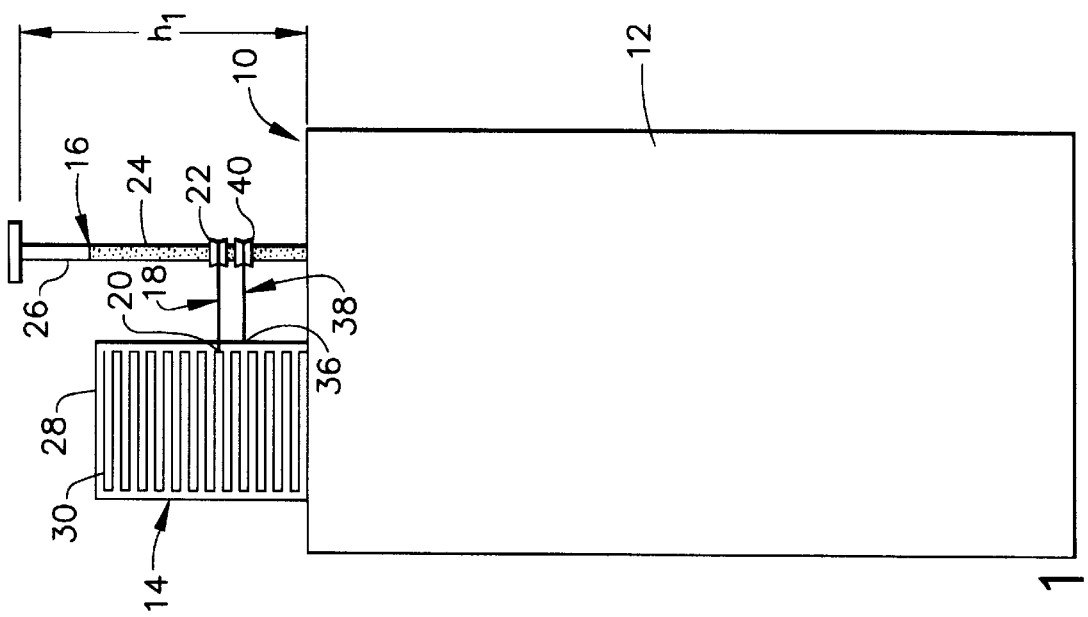

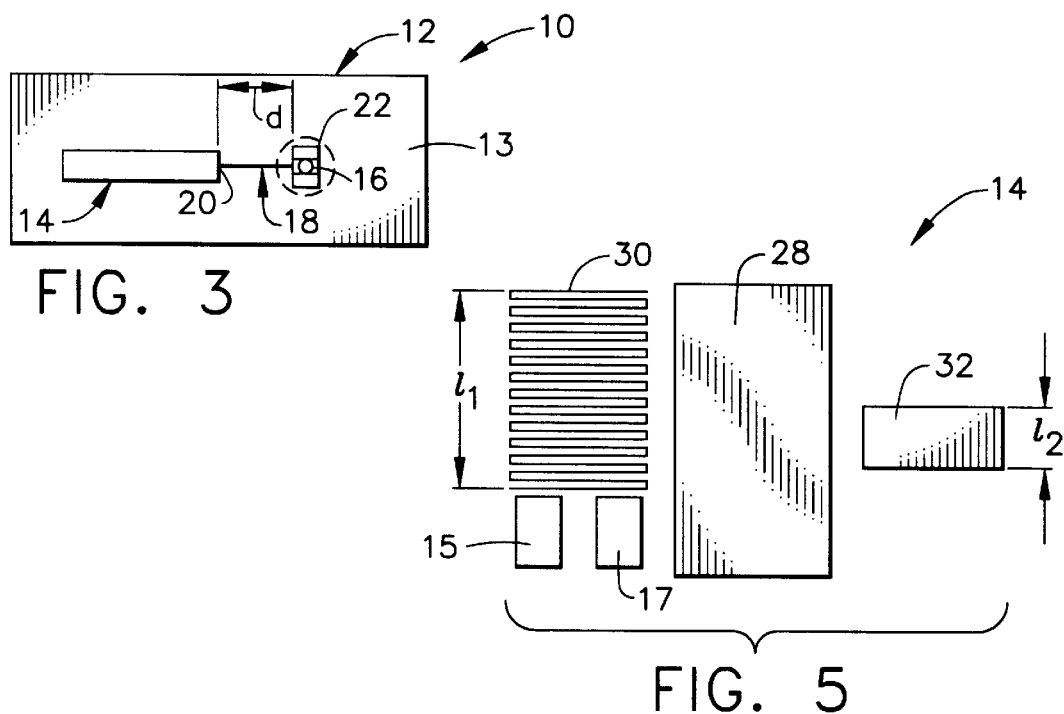
FIG. 3
FIG. 5
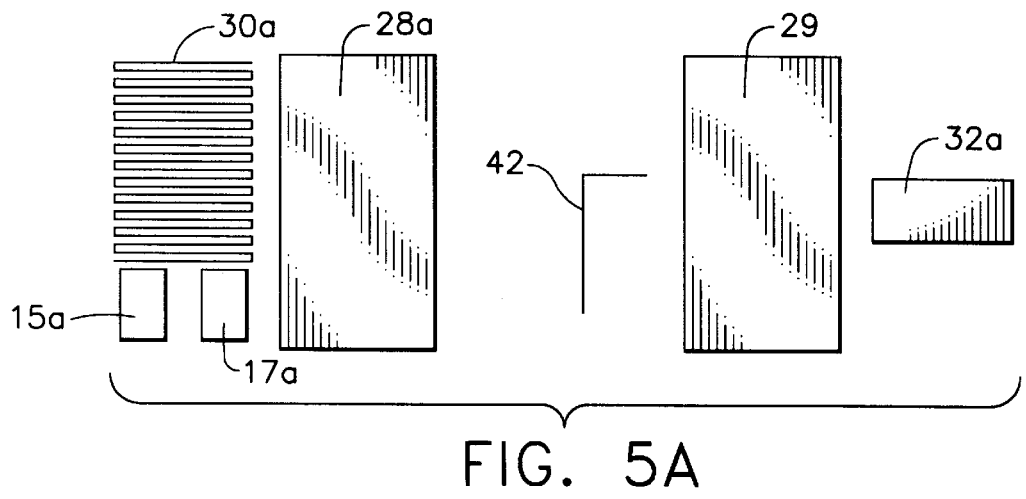
FIG. 5A
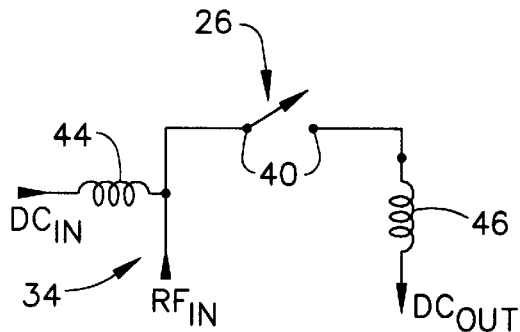
FIG. 6
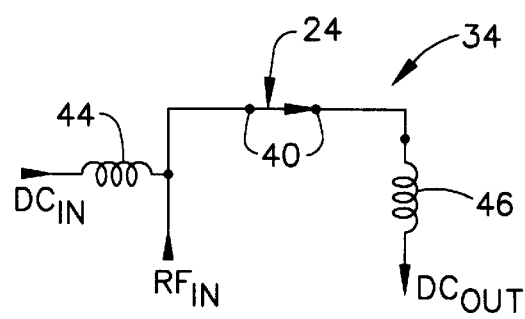
FIG. 7

DUAL ANTENNA ARRANGEMENT FOR PORTABLE TRANSCEIVER

BACKGROUND OF THE INVENTION

1. Field of the Invention

The present invention relates to a dual antenna arrangement for a portable transceiver and, more particularly, to a printed circuit antenna which is electrically coupled to or decoupled from a monopole antenna depending upon whether the monopole antenna is in an extended or retracted position.

2. Description of Related Art

It is well known in the portable transceiver art for a second smaller antenna to be utilized in conjunction with an extendable whip antenna. Because a whip antenna can be cumbersome when extended, it is normally preferred that it be retracted except when the transceiver is actively being utilized. The second antenna may be positioned internal of the transceiver housing (e.g., U.S. Pat. No. 4,958,382 to Imanishi and U.S. Pat. No. 5,138,329 to Saarnimo et al.) or as a separate antenna element located around or adjacent the whip antenna (e.g., U.S. Pat. No. 4,121,218 to Irwin et al.).

The internal antennas utilized in U.S. Pat. Nos. 4,958,382 and 5,138,329 are adequate for their intended purpose, but do not work in conjunction with their respective extendable antennas. This not only reduces the effectiveness of these antenna systems, but also may cause a time period where neither antenna is able to radiate.

The helical antenna in U.S. Pat. No. 4,121,218 is disclosed as being positioned around or adjacent to the whip antenna. While the helical antenna is relatively small in size (since it has an electrical length greater than its physical length), it is desired that an even smaller antenna be utilized which has an electrical length at least as great. Further, the distance of separation between the helical antenna and the whip antenna has a direct relationship on the capacitive coupling between them. This distance of separation also is a factor with regard to the impedance matching between the antennas, which may create the need for a compromise as to an optimum separation. Moreover, as noted in a patent application entitled "Printed Sleeve Monopole Antenna" having Ser. No. 08/459,237, which is owned by the assignee of the present invention, one disadvantage of a helical antenna is a reduction in its operating radiation bandwidth due to changes in the input impedance over frequency. In particular, this reduction in bandwidth results from the combination of lower radiation resistance due to smaller antenna size and a larger amount of stored energy causing a high Q.

It has also been found that physically small antennas (relative to the wavelength in free space) have higher energy storage in the reactive near field than electrically equivalent but physically longer antennas. Energy storage in the reactive near field is a mechanism by which energy is coupled to lossy media (e.g., human tissue) located in the reactive near field. Thus, for a given transmitted output power level, physically small antennas increase the energy coupling to the user of a portable transceiver device and emit non-ionizing, electromagnetic RF energy.

Accordingly, it is a primary object of the present invention to provide a dual antenna arrangement for a portable transceiver which permits radiation by a monopole antenna in an extended position and permits radiation by a printed circuit antenna when the monopole antenna is in a retracted position.

It is another object of the present invention to provide a dual antenna arrangement for a portable transceiver in which the size of the printed circuit antenna is minimized.

It is still another object of the present invention to provide a dual antenna arrangement for a portable transceiver where the antennas are matched for optimal transfer of power between them.

Yet another object of the present invention is to provide a dual antenna arrangement for a portable transceiver where the level of power transmitted is dependent upon which antenna is used.

Still another object of the present invention is to provide a dual antenna arrangement for a portable transceiver having a direct electrical connection between the two antennas.

These objects and other features of the present invention will become more readily apparent upon reference to the following description when taken in conjunction with the following drawing.

SUMMARY OF THE INVENTION

In accordance with one aspect of the present invention, an antenna arrangement for a portable transceiver is disclosed as including a printed circuit antenna mounted on the transceiver and coupled to be driven by circuitry of the transceiver. An extended monopole antenna is also mounted on the transceiver and is adapted to be electrically coupled to the printed circuit antenna when in an extended position and to be electrically decoupled from the printed circuit antenna when in a retracted position. A connector is fixedly attached to the printed circuit antenna at a first end and maintains contact with the monopole antenna at a second end as the monopole antenna slides between the extended and retracted positions. The monopole antenna includes a conductive portion which is in contact with the connector in the extended position and a non-conductive portion which is in contact with the connector in the retracted position.

In accordance with a second aspect of the present invention, a dual antenna arrangement for a portable transceiver is disclosed as including a circuit for sensing the position of an extendable monopole antenna between an extended position and a retracted position. When in an extended position, the monopole antenna is electrically coupled to a printed circuit antenna and used to transmit at full power. When the monopole antenna is in a retracted position, the monopole antenna is electrically decoupled from the printed circuit antenna and the printed circuit antenna is used to transmit at a reduced power level.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

FIG. 1 is a diagrammatic elevational view of a portable transceiver having a dual antenna arrangement of the present invention, where the monopole antenna is in an extended position;

FIG. 2 is a diagrammatic elevational view of the portable transceiver depicted in FIG. 1, where the monopole antenna is in a retracted position;

FIG. 3 is a top diagrammatic view of the portable transceiver depicted in FIGS. 1 and 2;

FIG. 5 is an exploded, diagrammatic front view of a first embodiment for the printed circuit antenna depicted in FIGS. 1–4;

FIG. 5A is an exploded, diagrammatic front view of an alternative embodiment for the printed circuit antenna depicted in FIGS. 1–4;

FIG. 6 is a circuit diagram representing a Direct Current position sensing circuit when the monopole antenna is in the retracted position; and FIG. 7 is a circuit diagram representing a Direct Current position sensing circuit when the monopole antenna is in the extended position.

DETAILED DESCRIPTION OF THE INVENTION

Figure 4:
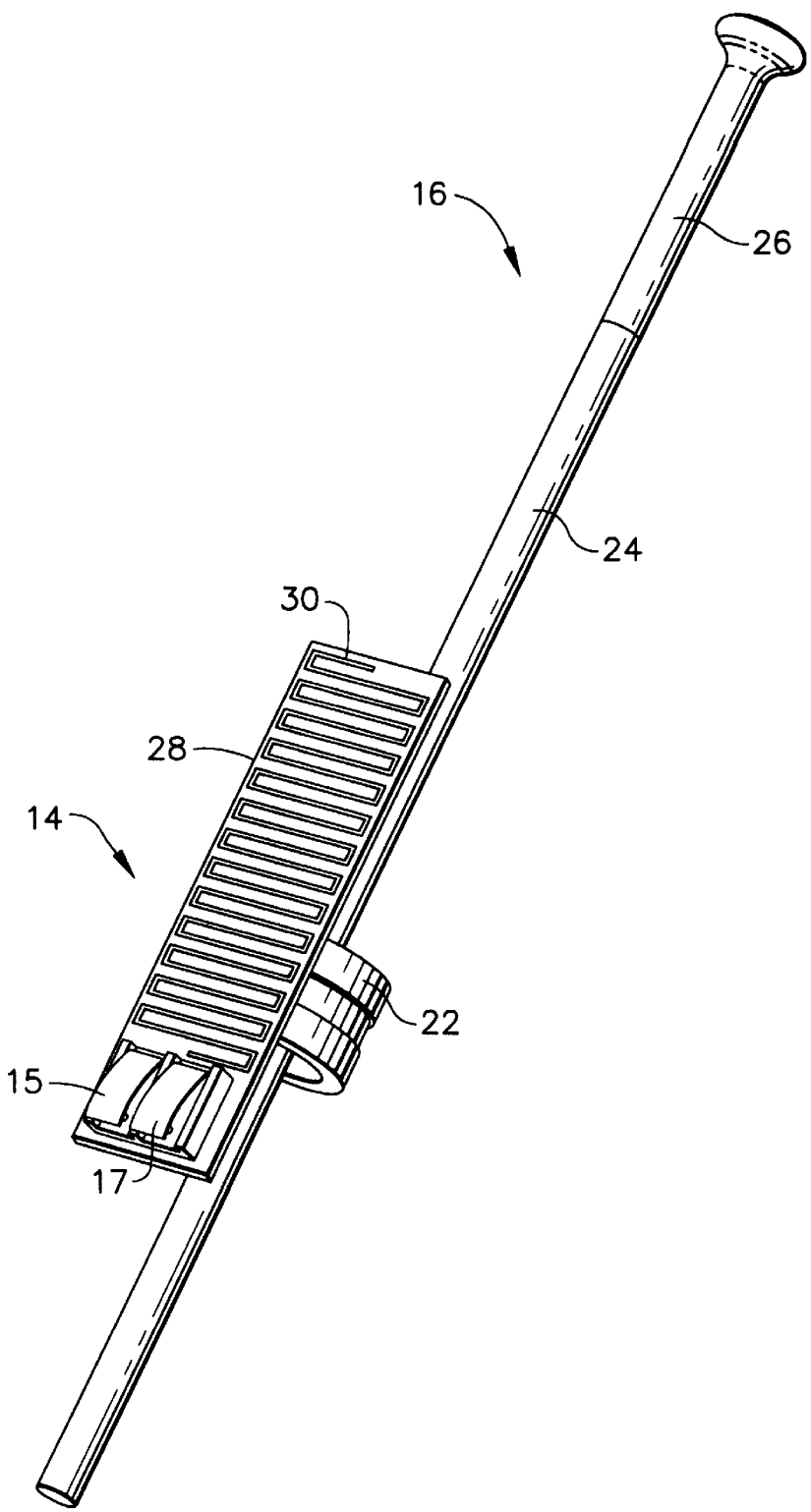
FIG. 4 is a perspective view of the dual antenna arrangement of FIGS. 1–3, where the printed circuit antenna is shown as being coupled to the monopole antenna.

Referring now to the drawing in detail, wherein identical numerals indicate the same elements throughout the figures, FIGS. 1 and 2 depict a portable transceiver 10 having a housing 12 which contains transmitting and receiving circuitry (not shown). In accordance with the present invention, a dual antenna arrangement for portable transceiver 10 is provided, where a first antenna 14 is preferably in the form of a printed circuit antenna and a second antenna 16 is preferably in the form of an extendable monopole antenna (also known as a whip antenna). It will be understood that only one of printed circuit antenna 14 or monopole antenna 16 will be utilized to transmit power at any given time.

In order to accomplish its intended purposes, it will be understood that printed circuit antenna 14 is connected directly to the transmitting and receiving circuitry in housing 12 by means of electrical connectors 15 and 17 positioned within transceiver housing 12. Monopole antenna 16 is extendable between an extended position having a height $h_1$ and a retracted position having a height $h_2$, each of these heights being measured with respect to a top surface 13 (see FIG. 3) of transceiver housing 12. A first connector 18 is provided having a first end 20 which is fixedly attached to printed circuit antenna 14 (such as by soldering) and a second end 22 being constructed so as to allow monopole antenna 16 to slide therethrough between the extended and retracted positions while still maintaining contact (preferably in the form of a pair of opposing spring fingers or the like). Monopole antenna 16 includes a conductive portion 24 which is located over a majority of monopole antenna 16 from a lower end to an upper tip portion 26, which is made of non-conductive material (e.g., any dielectric material). Accordingly, it will be seen in FIG. 1 that conductive portion 24 of monopole antenna 16 will be in contact with second end 22 of first connector 18 when in the extended position so that monopole antenna 16 is the radiating element of transceiver 10 at such time. Alternatively, when monopole antenna 16 is in the retracted position, it will be seen in FIG. 2 that non-conductive tip portion 26 thereof is in contact with second end 22 of first connector 18 so that printed circuit antenna 14 becomes the radiating element of transceiver 10. Although monopole antenna 16 may have a telescoping type configuration, it is preferred that it maintain a constant length with at least a majority of conductive portion 24 thereof being contained within transceiver housing 12 when in the retracted position (see FIG. 2).

It will be understood that a distance d between printed circuit antenna 14 and monopole antenna 16, as reflected by their respective positioning along top surface 13 of transceiver housing 12 in FIG. 3, is designed in order that an optimal antenna efficiency for monopole antenna 16 is obtained when it is in the extended position. This is because printed circuit antenna 14 contains an impedance matching network to monopole antenna 16 when it is in the extended position.

Printed circuit antenna 14 generally conforms to an antenna described in a patent application entitled "Printed Monopole Antenna," Ser. No. 08/459,237, which is owned by the assignee of the present invention and is hereby incorporated by reference. Accordingly, printed circuit antenna 14 includes a printed circuit board 28 which is substantially rectangular in shape and has first and second sides. As best seen in FIG. 5, a radiating element in the form of a first conductive trace 30 is formed on printed circuit board 28 and has a physical length $l_1$ from a feed end to an opposite end. Electrical connectors 15 and 17 are affixed to printed circuit board 28 and coupled to first conductive trace 30. Printed circuit antenna 14 preferably includes a conductive element in the form of a second conductive trace 32 formed on the opposite side of printed circuit board 28 as first conductive trace 30, where second conductive trace 32 has a physical length $l_2$ from a grounding end to an opposite end. It is preferred that second conductive trace 32 be a conductive patch element (as seen in FIG. 5) which defines an extended ground plane that effects a virtual feedpoint at that portion of first conductive trace 30 aligned with second conductive trace 32. Second conductive trace 32 may also be formed on the same side of printed circuit board 28 as first conductive trace 30. In either event, physical length $l_2$ of second conductive trace 32 is sized to provide an impedance match with first conductive trace 30.

It will be seen in FIGS. 1 and 2 that printed circuit antenna 14 has a height $h_3$ at which it extends from top surface 13 of transceiver housing 12. Preferably, first connector 18 will be connected to first conductive trace 30 by means of soldering or other equivalent measures. It will be noted that first connector 18 will be positioned so as to be at a height $h_4$ with respect to top surface 13 of transceiver housing 12, which preferably is approximately the same as physical length $l_2$ of second conductive trace 32. In order to minimize the size of printed circuit antenna 14, it will be seen that first conductive trace 30 has a non-linear design so that its electrical length is greater than physical length $l_1$. In this way, printed circuit antenna 14 is able to have a height $h_3$ which preferably is approximately a quarter-wavelength of a desired center frequency for transceiver operation while minimizing the overall physical size thereof. Consequently, printed circuit antenna 14 is able to work in conjunction with monopole antenna 16, which preferably has a height $h_1$ in the extended position which is approximately a half-wavelength of the desired center frequency for transceiver operation. This non-linear shape of first conductive trace 30 also enables adjustment of first connector 18 in a horizontal fashion to further enhance matching between printed circuit antenna 14 and monopole antenna 16.

As noted hereinabove, physically small antennas like printed circuit antenna 14 generally have higher energy storage in the reactive near field than electrically equivalent but physically longer antennas. Therefore, for a given transmitted output power level, physically small antennas increase the energy coupling to the user of a portable transceiver device (since energy storage in the reactive near field is a mechanism by which energy is coupled to lossy media such as human tissue) and emit non-ionizing, electromagnetic RF energy. In order to minimize the energy coupling to the user of transceiver 10, a switching circuit 34 may be utilized therewith to reduce the power transmitted by transceiver 10 when printed circuit antenna 14 is the one being utilized (i.e., when monopole antenna 16 is in the retracted position). In this regard, position sensing circuit 34 may be represented as a Direct Current (DC) circuit. This may be accomplished by connecting a first end 36 of a second connector 38 (see FIGS. 1 and 2) to an alternate embodiment of printed circuit antenna, designated as 14a. As seen in FIG. 5A, printed circuit antenna 14a includes a first printed circuit board 28a substantially rectangular in shape and having first and second sides. First printed circuit board 28a includes a first conductive trace 30a formed thereon, as well as connectors 15a and 17a affixed thereto like those shown and described with respect to printed circuit antenna 14. However, printed circuit antenna 14a further includes a second printed circuit board 29 positioned adjacent first printed circuit board 28a, where second printed circuit board 29 also is substantially rectangular in shape and has first and second sides. In this way, printed circuit antenna 14a is made up of a multi-layer board having two or more printed circuit boards. In particular, second connector first end 36 is connected to a secondary trace 42, which is shown as being formed on a first surface of second printed circuit board 29. Alternatively, secondary trace 42 may be positioned on the rear surface of first printed circuit board 28a. Secondary trace 42 is connected to connector 17a by means of a hole or via (not shown) through first printed circuit board 28a. Conductive patch 32a is then formed on the rear surface of second printed circuit board 29.

A second end 40 of second connector 38 is in sliding contact with monopole antenna 16. This is similar to the direct electrical connection between printed circuit antenna 14 and monopole antenna described above with respect to first connector 18. Therefore, when monopole antenna 16 is in a retracted position, non-conductive portion 26 is in contact with second connector end 40 to form an open DC circuit (see FIG. 6). By so doing, this causes a reduction in the power to be transmitted by printed circuit antenna 14a. Otherwise, conductive portion 24 of monopole antenna 16 is in contact with second connector end 40 to form a closed DC circuit (see FIG. 7) so that maximum power is transmitted by monopole antenna 16. Of course, position sensing circuit 34 is only one way to sense the position of monopole antenna 16 and the amount of power to be transmitted. Other DC sensing techniques may be utilized, such as grounding one spring finger of second connector end 40 and sensing the other spring finger thereof for a DC ground. It will also be noted that a pair of series inductors 44 and 46 may be positioned adjacent the DC in and DC out of position sensing circuit 34 in order to block any RF signals from entering and thereby degrading the performance of monopole antenna 16.

Having shown and described the preferred embodiment of the present invention, further adaptations of the dual antenna arrangement for a portable transceiver can be accomplished by appropriate modifications by one of ordinary skill in the art without departing from the scope of the invention. For example, a single connector may be utilized to provide the direct electrical connection between printed circuit antenna 14 and monopole 16, where the proper antenna and amount of power to be radiated thereby is identified by the position of monopole antenna 16. Of course, if no distinction in power level is required, then only the antenna to be utilized is determined.

What is claimed is:

1. An antenna arrangement for a portable transceiver, comprising:
   (a) a printed circuit monopole antenna mounted on said transceiver and coupled to be driven by circuitry of said transceiver;
   (b) an extendable monopole antenna mounted on said transceiver adapted to be electrically coupled to said printed circuit monopole antenna when in an extended position and to be electrically decoupled from said printed circuit monopole antenna when in a retracted position; and
   (c) a connector having a first end fixedly attached to said printed circuit monopole antenna and a second end which maintains contact with said extended monopole antenna as it slides between said extended and retracted positions.

2. The antenna arrangement of claim 1, said extendable monopole antenna including a conductive portion and a non-conductive portion, wherein said extendable monopole antenna conductive portion is in contact with said connector in said extended position and said extendable monopole antenna non-conductive portion is in contact with said connector in said retracted position.

3. The antenna arrangement of claim 1, wherein said connector is attached to said printed circuit monopole antenna at a position which incorporates impedance matching circuitry between said printed circuit monopole antenna and said extendable monopole antenna.

4. The antenna arrangement of claim 1, wherein said extendable monopole antenna is a radiating element of said transceiver when said extendable monopole antenna is in said extended position and said printed circuit monopole antenna is a radiating element of said transceiver when said extendable monopole antenna is in said retracted position.

5. The antenna arrangement of claim 1, said printed circuit monopole antenna further comprising:
   (a) a printed circuit board having a first side and a second side; and
   (b) a radiating element comprising a first conductive trace formed on said printed circuit board first side having a physical length from a feed end to an opposite end.

6. The antenna arrangement of claim 5, said first conductive trace having an electrical length greater than said physical length.

7. The antenna arrangement of claim 5, said printed circuit monopole antenna further comprising a conductive element comprising a second conductive trace formed on said printed circuit board adjacent said first conductive trace, said second conductive trace having a physical length from a grounding end to an opposite end, wherein said second conductive trace defines an extended ground plane which effects a virtual feedpoint at that portion of said first conductive trace aligned with said second conductive trace.

8. The antenna arrangement of claim 7, wherein said second conductive trace is formed on said printed circuit board second side.

9. The antenna arrangement of claim 7, wherein said second conductive trace is formed on said printed circuit board first side.

10. The antenna arrangement of claim 7, wherein the physical length of said second conductive trace is sized to provide an impedance match with said first conductive trace.

11. The antenna arrangement of claim 7, wherein said connector is attached to said printed circuit monopole antenna at a height above said transceiver approximately equal to the physical length of said second conductive trace.

12. The antenna arrangement of claim 1, further comprising a circuit for sensing the position of said extendable monopole antenna, wherein said circuit permits said transceiver to transmit at full power when said extendable monopole antenna is in said extended position and permits said transceiver to transmit at reduced power when said extendable monopole antenna is in said retracted position.

13. The antenna arrangement of claim 12, said position sensing circuit further comprising:
   (a) a secondary conductive trace formed on said printed circuit monopole antenna; and
   (b) a connector fixedly attached to one end of said secondary conductive trace at a first end and slidingly attached to said extendable monopole antenna at a second end.

14. The antenna arrangement of claim 13, wherein the other end of said secondary conductive trace is connected to said transceiver circuitry.

15. The antenna arrangement of claim 13, wherein the other end of said secondary conductive trace is connected to ground.

16. The antenna arrangement of claim 13, said position sensing circuit further comprising a first inductor positioned in series with an input of said circuit and a second inductor positioned in series with an output of said circuit, wherein RF signals are prevented from entering said circuit.

17. The antenna arrangement of claim 13, said printed circuit monopole antenna further comprising:
   (a) a first printed circuit board having a first side and a second side;
   (b) a radiating element comprising a first conductive trace formed on said first printed circuit board first side having a physical length from a feed end to an opposite end; and
   (c) a second printed circuit board having a first side and a second side;
wherein said secondary trace is formed on said first printed circuit board second side.

18. The antenna arrangement of claim 17, further comprising a conductive patch on said second printed circuit board second side.

19. The antenna arrangement of claim 13, said printed circuit monopole antenna further comprising:
   (a) a first printed circuit board having a first side and a second side;
   (b) a radiating element comprising a first conductive trace formed on said first printed circuit board first side having a physical length from a feed end to an opposite end; and
   (c) a second printed circuit board having a first side and a second side;
wherein said secondary trace is formed on said second printed circuit board first side.

20. The antenna arrangement of claim 19, further comprising a conductive patch on said second printed circuit board second side.

21. The antenna arrangement of claim 1, wherein said monopole antenna exhibits approximately a half-wavelength resonance at a desired frequency for transceiver operation in said extended position.

22. The antenna arrangement of claim 1, wherein said printed circuit monopole antenna exhibits approximately a quarter-wavelength resonance at a desired center frequency for transceiver operation.

23. The antenna arrangement of claim 1, said printed circuit monopole antenna being positioned a distance from said extendable monopole antenna so that an optimal antenna efficiency for said extendable monopole antenna is obtained when in said extended position.

24. The antenna arrangement of claim 1, said printed circuit monopole antenna containing an impedance matching network to said extendable monopole antenna when said extendable monopole antenna is in said extended position.

25. A portable radio transceiver, comprising:
   (a) transmitting and receiving circuitry;
   (b) a housing enclosing said transmitting and receiving circuitry; and
   (c) an antenna arrangement comprising:
      (1) a printed circuit monopole antenna mounted on said transceiver housing coupled to and driven by said transmitting and receiving circuitry;
      (2) an extendable monopole antenna mounted on said transceiver housing so as to be slidable from an extended position to a retracted position; and
      (3) a connector having a first end fixedly attached to said printed circuit monopole antenna and a second end which maintains contact with said extendable monopole antenna as it slides between said extended and retracted positions;
wherein said printed circuit monopole antenna and said extendable monopole antenna are electrically coupled in said extended position so that said extendable monopole antenna is a radiating element of said radio transceiver and said printed circuit monopole antenna and said extendable monopole antenna are electrically decoupled in said retracted position so that said printed circuit monopole antenna is a radiating element of said radio transceiver.

* * * * *